Dec. 12, 1967 A. S. DECKER ETAL 3,357,349

RECIPROCATING POWER BED WITH PLURAL REPLENISHING MEANS FOR ELECTROSTATIC PRINTER

Filed Feb. 10, 1967 8 Sheets-Sheet 1

INVENTORS
ALFRED S. DECKER
GEORGE R. OBENSHAIN
LUTHER H. WIDEMAN

J. R. Nelson and W. A. Schaich
ATTORNEYS

INVENTORS
ALFRED S. DECKER
GEORGE R. OBENSHAIN
LUTHER H. WIDEMAN
J. R. Nelson and W. A. Schaich
ATTORNEYS

INVENTORS
ALFRED S. DECKER
GEORGE R. OBENSHAIN
LUTHER H. WIDEMAN

J. R. Nelson and W. A. Schaich
ATTORNEYS

INVENTORS
ALFRED S. DECKER
GEORGE R. OBENSHAIN
LUTHER H. WIDEMAN
J. R. Nelson and W. A. Schaich
ATTORNEYS INVENTORS
ALFRED S. DECKER
GEORGE R. OBENSHAIN
LUTHER H. WIDEMAN
J. R. Nelson and W. A. Schmidt
ATTORNEYS

INVENTORS
ALFRED S. DECKER
GEORGE R. OBENSHAIN
LUTHER H. WIDEMAN

J. R. Nelson and W. A. Schmidt
ATTORNEYS

Dec. 12, 1967 A. S. DECKER ETAL 3,357,349

RECIPROCATING POWER BED WITH PLURAL REPLENISHING MEANS FOR ELECTROSTATIC PRINTER

Filed Feb. 10, 1967 8 Sheets-Sheet 7

INVENTORS
ALFRED S. DECKER
GEORGE R. OBENSHAIN
LUTHER H. WIDEMAN

J. R. Nelson and W. A. Schaich
ATTORNEYS

INVENTORS
ALFRED S. DECKER
GEORGE R. OBENSHAIN
LUTHER H. WIDEMAN
J. R. Nelson and W. A. Schmitz
ATTORNEYS United States Patent Office 3,357,349 Patented Dec. 12, 1967

3,357,349

RECIPROCATING POWER BED WITH PLURAL REPLENISHING MEANS FOR ELECTROSTATIC PRINTER

Alfred S. Decker, Toledo, George R. Obenshain, Sylvania, and Luther H. Wideman, Toledo, Ohio, assignors to Owens-Illinois, Inc., a corporation of Ohio Filed Feb. 10, 1967, Ser. No. 615,206
7 Claims. (Cl. 101—114)

ABSTRACT OF THE DISCLOSURE

An apparatus and method for cyclically replenishing and conditioning a bed of printing powder particles in operative relationship to the stencil screen of an electrostatic printer to permit high production operation of the printer. An elongate powder bed supporting tray is continuously reciprocated beneath the stencil screen and at the end of each stroke a measured charge of powder is dispensed on to the tray to replace the powder transferred from the tray during that stroke. Upon stroke reversal, a doctor mechanism smooths the dispensed charge so that the bed presents a smooth uniform surface to the stencil screen at all times.

*Cross-references to related applications*

The present invention is especially adapted for use in conjunction with an electrostatic printing apparatus of the type disclosed in the co-pending application of A. S. Decker et al., Ser. No. 595,490, filed November 18, 1966, and assigned to the assignee of the present application. The electrostatic printing techniques disclosed in the co-pending applications of William E. Johnson, Ser. No. 575,868, filed Aug. 29, 1966, and Ser. No. 439,799, filed Mar. 15, 1965, both assigned to the assignee of the present application, are well adapted for use with the present invention.

*Background of the invention*

The invention pertains to that branch of electrostatic printing wherein printing powder particles are transferred from a supply bed through a stencil screen to a substrate surface which may take the form of either an offset plate from which the image is subsequently transferred to the article surface or directly from the bed through the screen to the article surface itstlf. The transfer is accomplished by establishing an electric field while simultaneously charging powder particles in the bed to a potential such that the electric field electrically impels the particles from the bed through the apertures in the stencil screen to the substrate surface. In order to achieve a uniform density in the powder image on the substrate surface, the surface of the bed at the time of transfer should be smooth, and the bed should be loosely and uniformly packed. It has been found that the process of electrostatic transfer causes a packing of the bed in a non-uniform manner, while the particles which are transferred from the bed deplete the bed and likewise contribute to a non-uniform surface. As developed in greater detail in the aforementioned Johnson application Ser. No. 439,799, it is difficult to achieve uniform density of images by successive transfers from the same powder bed and the Johnson patent is directed to methods and apparatus for overcoming this particular problem.

On a commercial production basis, however, it is obvious that some provision must be made for periodically replenishing the bed and contributing the bed surface and the present invention is specifically directed to the solution of those problems.

*Summary of the invention*

In accordance with the present invention, a conveyor, such as that described in detail in the above mentioned Decker et al. application, is operated to successively position substrate surfaces in operative registry above a stationary stencil screen. At each side of the conveyor, beside the screen, a powder supply hopper is positioned. An elongate powder bed supporting tray is positioned in operative registry beneath the stencil screen and hoppers and is mounted for longitudinal reciprocatory movement beneath the stencil screen in a direction longitudinally of the tray and transversely of the conveyor. Between each hopper and the stencil screen a doctor bar assembly is located. The length of the stroke of the tray is regulated so that the tray is always beneath both hoppers. When the tray reaches one end of its stroke, it actuates a dispensing mechanism to dispense a measured charge of powder from the hopper on to the tray. Upon the reversal of stroke, the dispensed pile of powder must pass beneath the doctor mechanism before passing beneath the stencil screen, thus presenting at all times to the screen a smooth doctored surface of the powder bed.

In the drawings:

FIGURE 3 is an end elevational view of the apparatus of FIGURE 1, with certain parts omitted;

Figure 1:
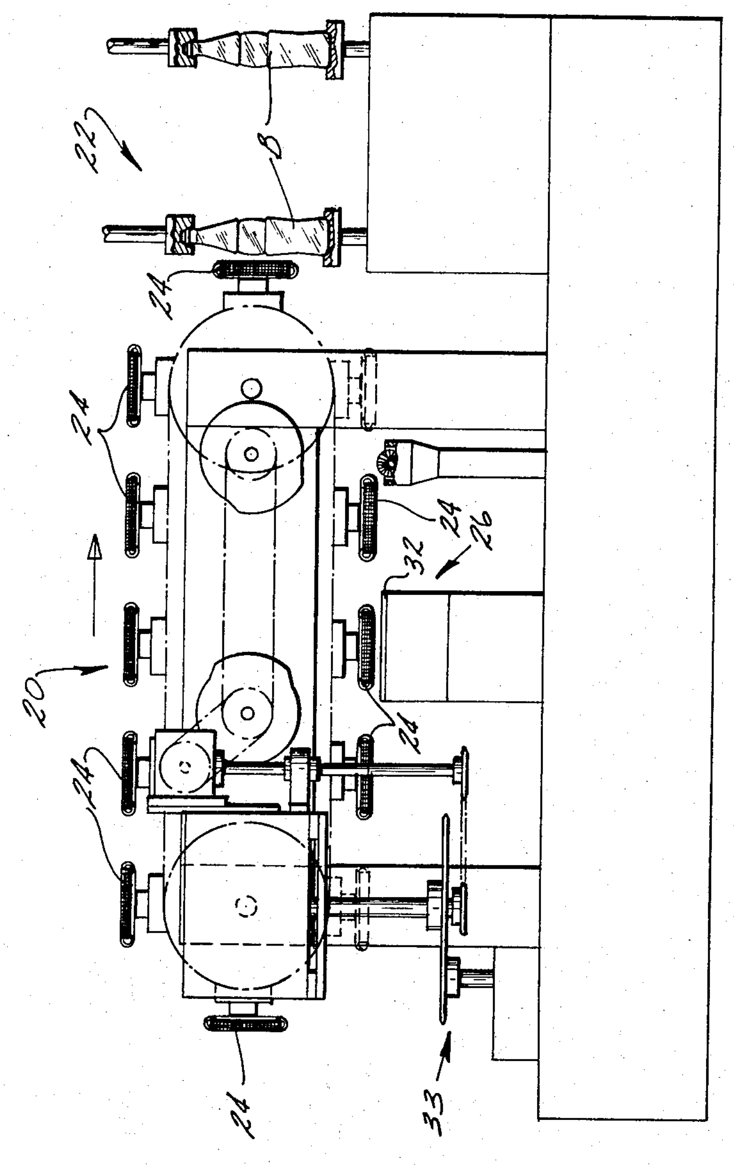
FIGURE 1 is a side elevational view of an electrostatic printing apparatus embodying the present invention, with certain parts broken away, omitted or shown in section.
Figure 2:
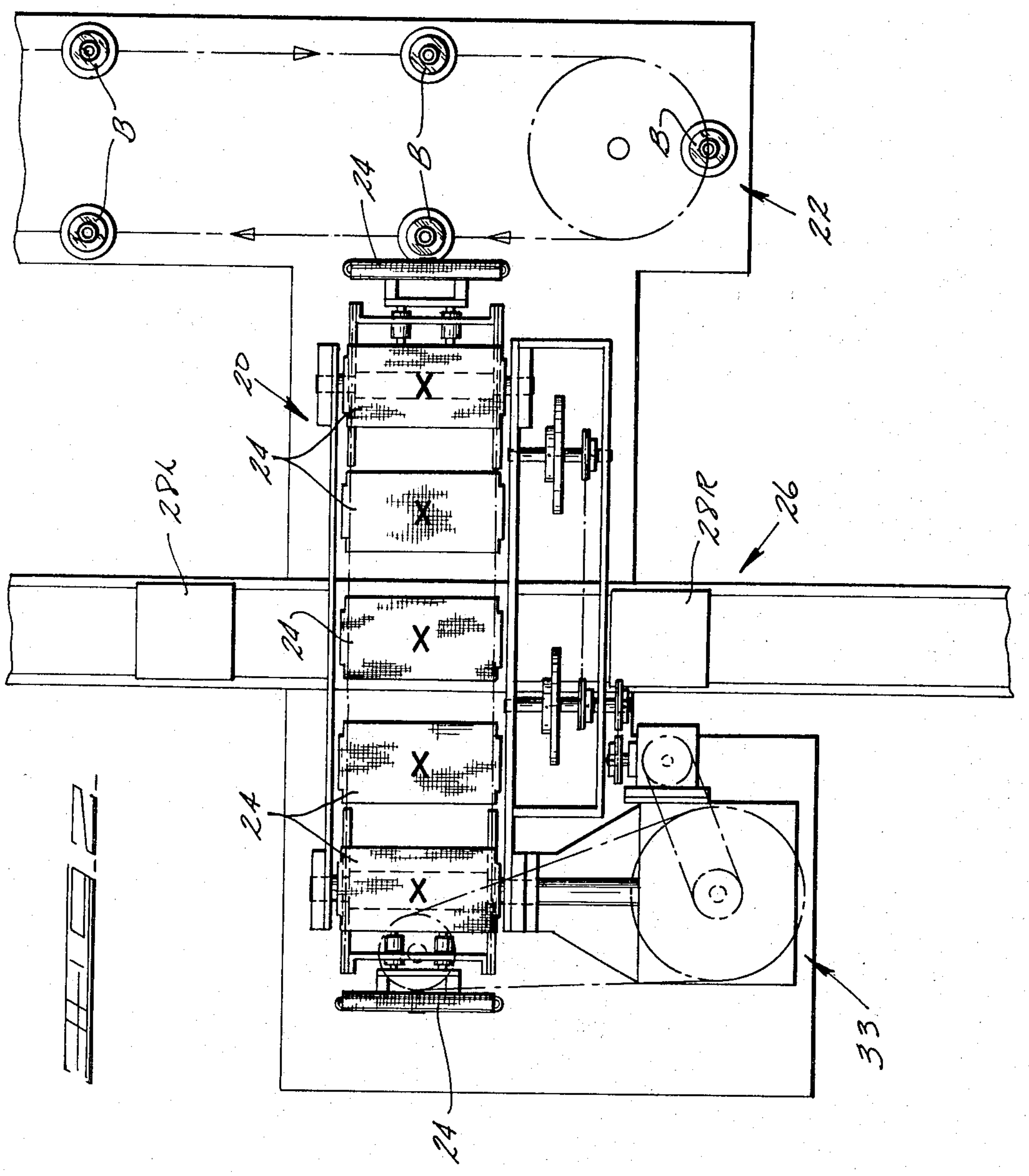
FIGURE 2 is a top plan view of the apparatus of FIGURE 1, again with certain parts broken away or omitted.
Figure 2:
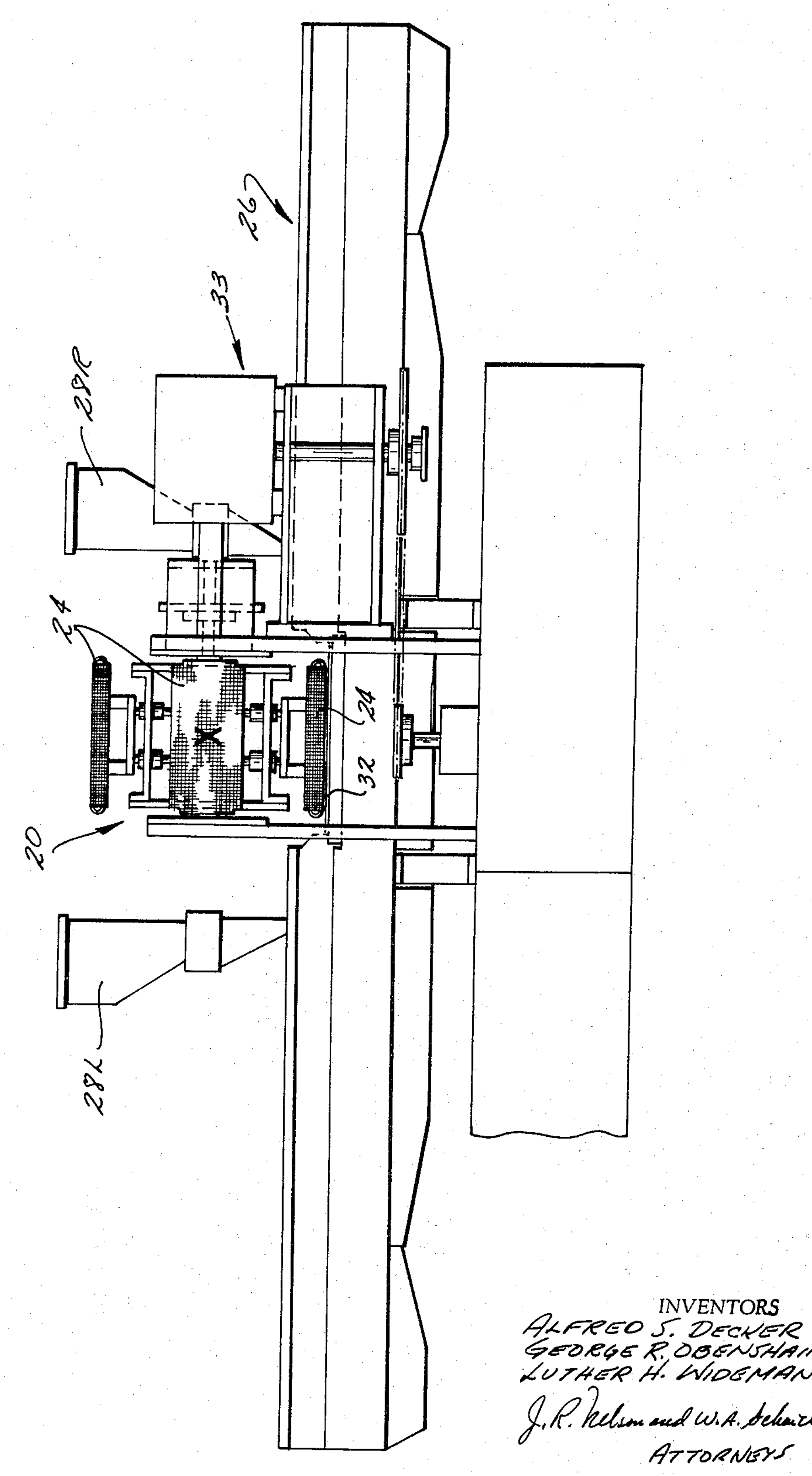

In the drawings, referring particularly to FIGURES 1 through 3, the present invention is shown as applied to an electrostatic printing apparatus of the offset type which includes an offset plate conveyor designated generally 20 and a bottle conveyor 22 which conveys articles to be printed in the form of bottles B into operative registry with an offset plate assembly 24. Details of bottle conveyor 20, plate assemblies 24 and bottle conveyor 22 are disclosed in the co-pending application of A. S. Decker et al., Ser. No. 595,490, filed Nov. 18, 1966, and assigned to the assignee of the present application.

The present invention is concerned with the apparatus for applying an image of printing powder particles to the offset plate assemblies 24 and, in its more detailed aspects is especially directed to the powder supply bed and the means by which the bed is maintained in proper condition to permit successive transfers of powder images from the bed to the offset plate assemblies 24 on a high production basis.

Referring to FIGURE 3, the powder supply mechanism with which the present invention is especially concerned includes an elongate casing designated generally 26 which extends transversely beneath plate conveyor 20. A pair of powder supply hoppers 28L and 28R respectively are mounted upon the casing at symmetrically spaced locations on opposite sides of conveyor 20. The powder supply mechanism, as viewed in FIGURE 3, is symmetrical about the center line of conveyor 20, the structure to the right of the center line being duplicated in mirror image to the left of the center line. Because of this relationship, the detail views of FIGURES 4 through 8 show primarily the mechanism to the right of the center line, and it will be understood in the following description that like structure, mounted in opposite hand relationship, is employed on the left-hand side of the center line of conveyor 20.

Figure 4:
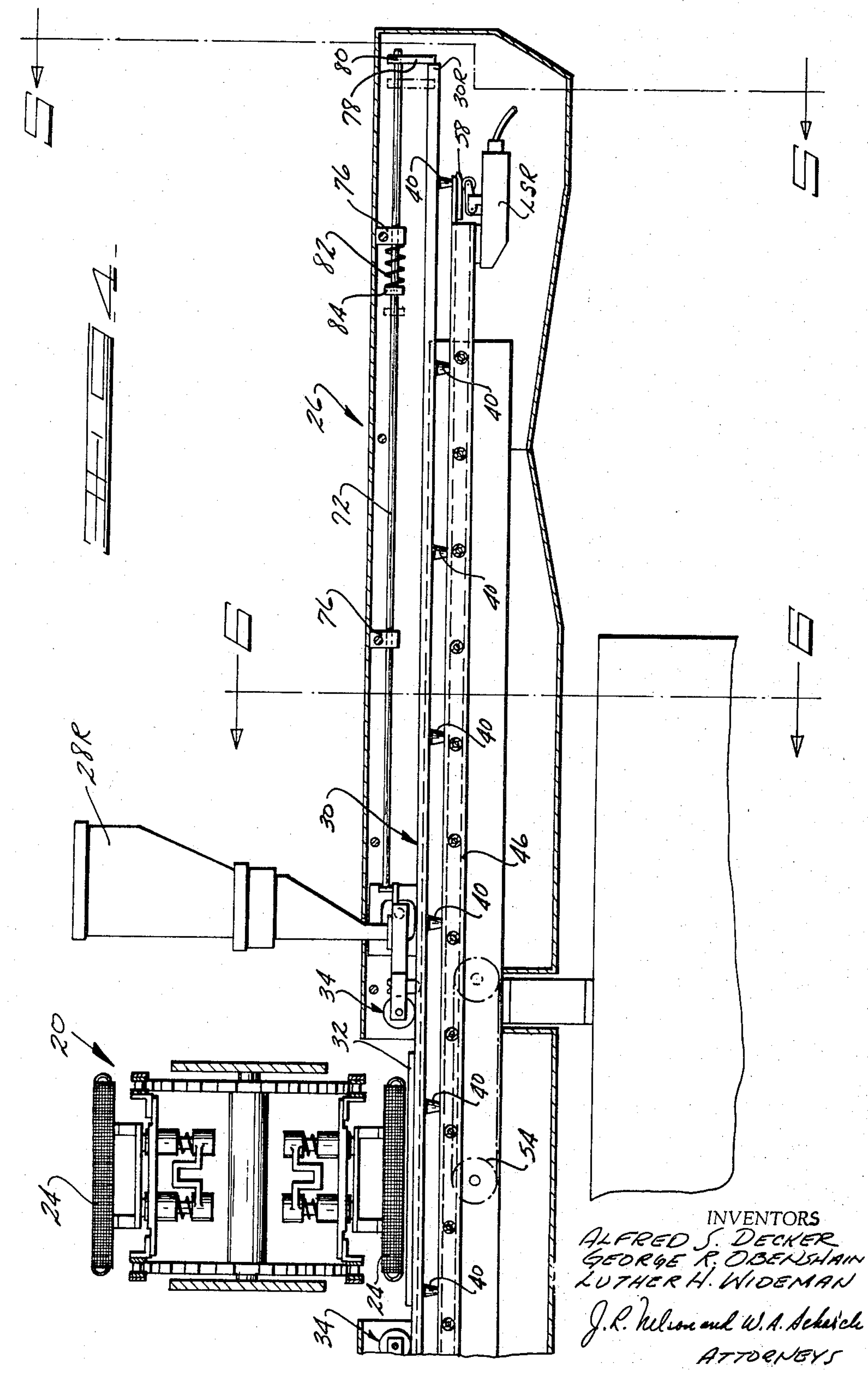
FIGURE 4 is a detail end elevational view, partially in section, of the right-hand side of the apparatus.
Figure 7:
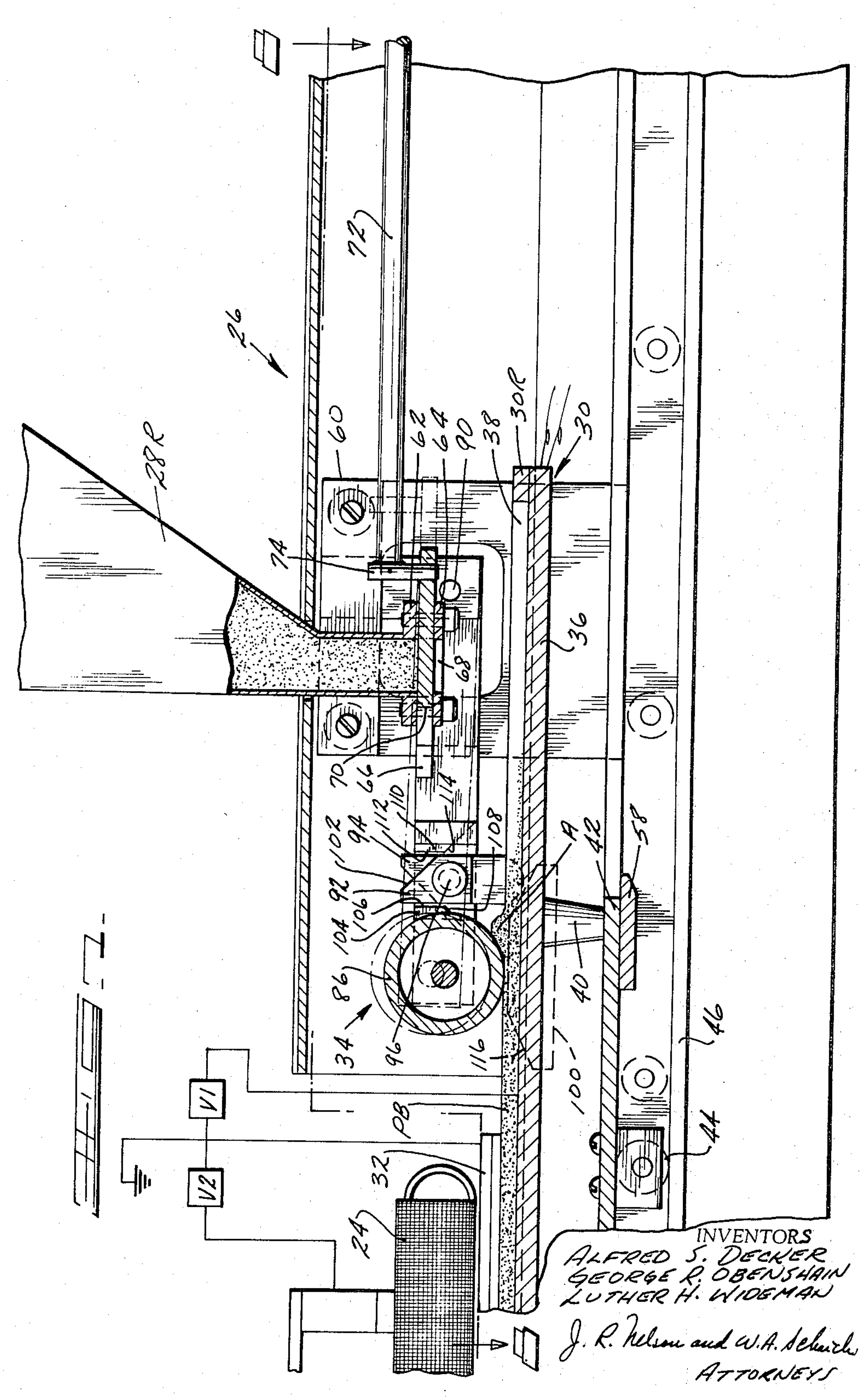
FIGURE 7 is a detail cross sectional view of the hopper and doctor mechanism.
Figure 8:
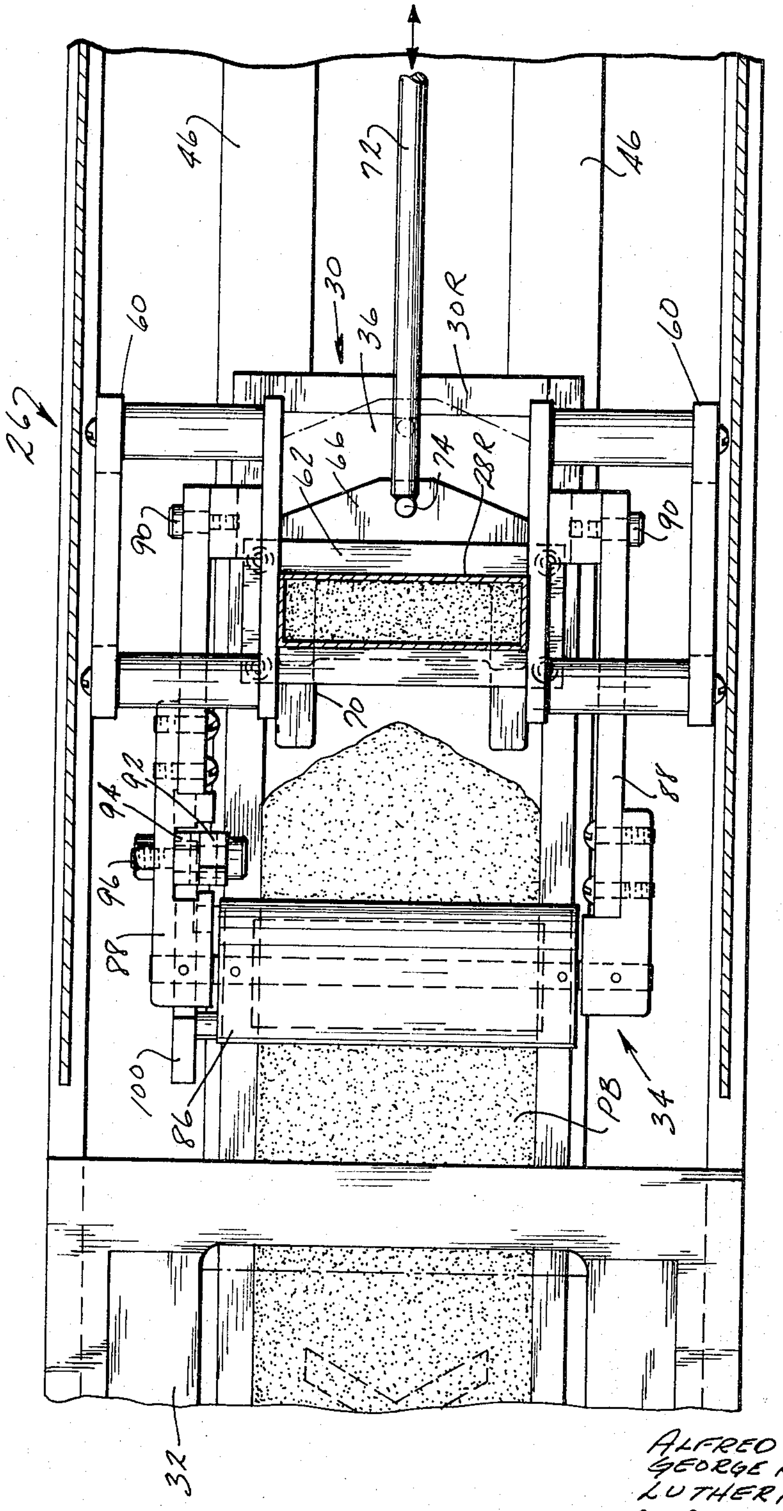
FIGURE 8 is a detail top plan view, partially in section, taken on the line 8—8 of FIGURE 7.

Before discussing the powder supply mechanism in detail, it is believed that a brief summary of its overall operation will make the mechanical details more readily understandable. Referring particularly to FIGURES 4 and 7, the powder supply mechanism includes an elongate powder bed supporting tray 30 which is mounted for longitudinal reciprocatory movement back-and-forth beneath the powder supply hoppers 28R and 28L. Tray 30 also underlies, throughout its full range of movement, a stencil screen 32 which is supported in a fixed position upon casing 26 to underlie offset plate assemblies 24. As described in greater detail in the aforementioned Decker et al. application Ser. No. 595,490, offset plate conveyor 20 is driven in step-by-step movement to advance plate assemblies in succession into operative registry with bottles B on bottle conveyor 22. The powder supply mechanism is so located that during each step of movement of the offset plate conveyor 20, by a drive means designated generally 33 (FIGURE 2), a plate assembly 24 is located in vertical registry with stencil screen 32. While the plate assembly 24 is in registry with stencil screen 32, powder from the supply bed contained in tray 30 is electrostatically transferred from the bed upwardly through the image aperture in stencil screen 32 to the substrate surface defined by the offset plate assembly 24.

While suitable arrangements for accomplishing the electrostatic transfer of powder from the supply bed contained in tray 30 to the substrate surface of plate assembly 24 are well known in the art, the present invention is especially adapted for use in combination with the electrostatic printing technique disclosed in the co-pending application of William E. Johnson, Ser. No. 439,799, filed Mar. 15, 1965, and assigned to the assignee of the present application. In the Johnson application Ser. No. 439,799, the time duration of the application of the electric field during the powder transfer is automatically regulated so that images of uniform density are obtained on substrate surfaces where several successive transfers of powder from the same powder supply bed are made.

The powder supply apparatus disclosed, by driving the powder supply tray 30 back-and-forth beneath the stencil screen and replenishing the powder supply at each end of each stroke of movement alternately from hoppers 28L and 28R enables the apparatus to continuously present a smooth, accurately leveled powder supply bed surface beneath stencil screen 32 to assist in achieving uniform density of images on offset plate assemblies 24. A doctor mechanism designated generally 34 is mounted between each hopper and stencil screen 32 to smooth the surface of the powder supply bed in a manner to be described in more detail below.

Figure 5:
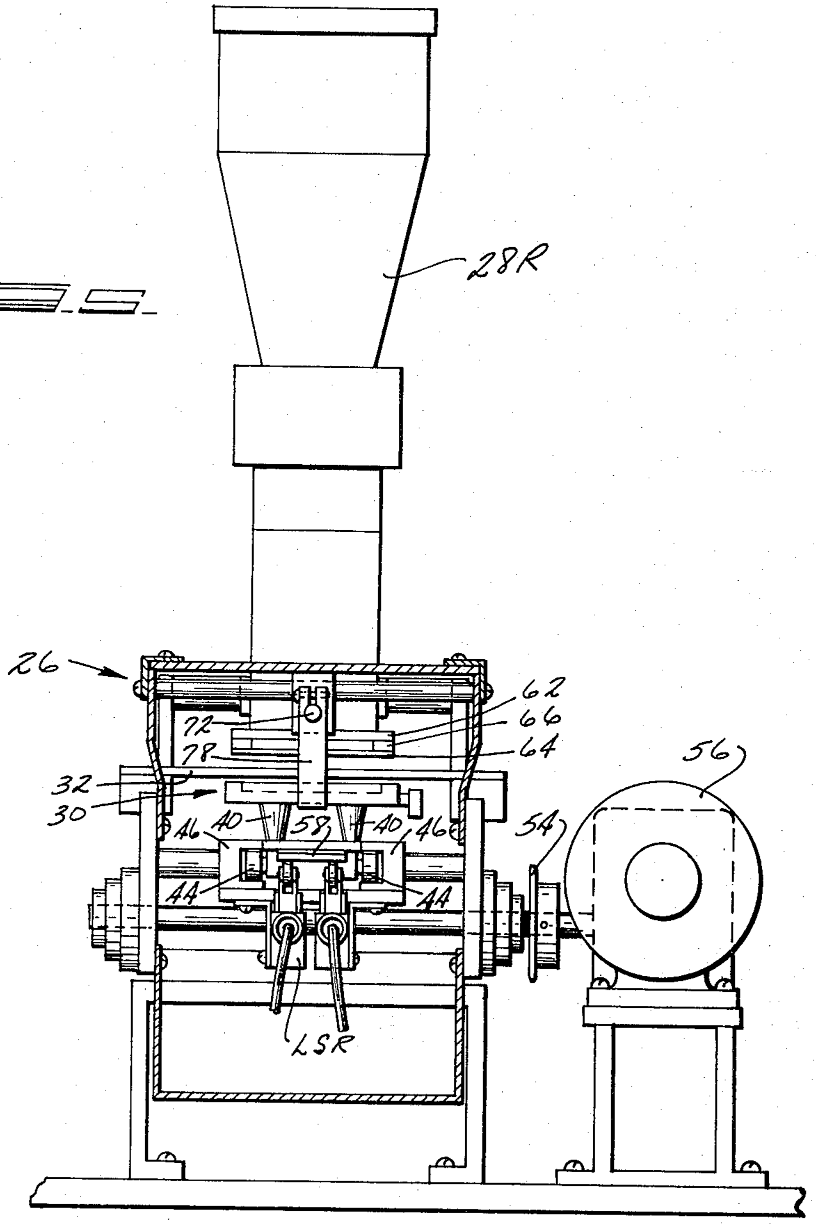
FIGURE 5 is a detail cross sectional view taken on the line 5—5 of FIGURE 4.
Figure 6:
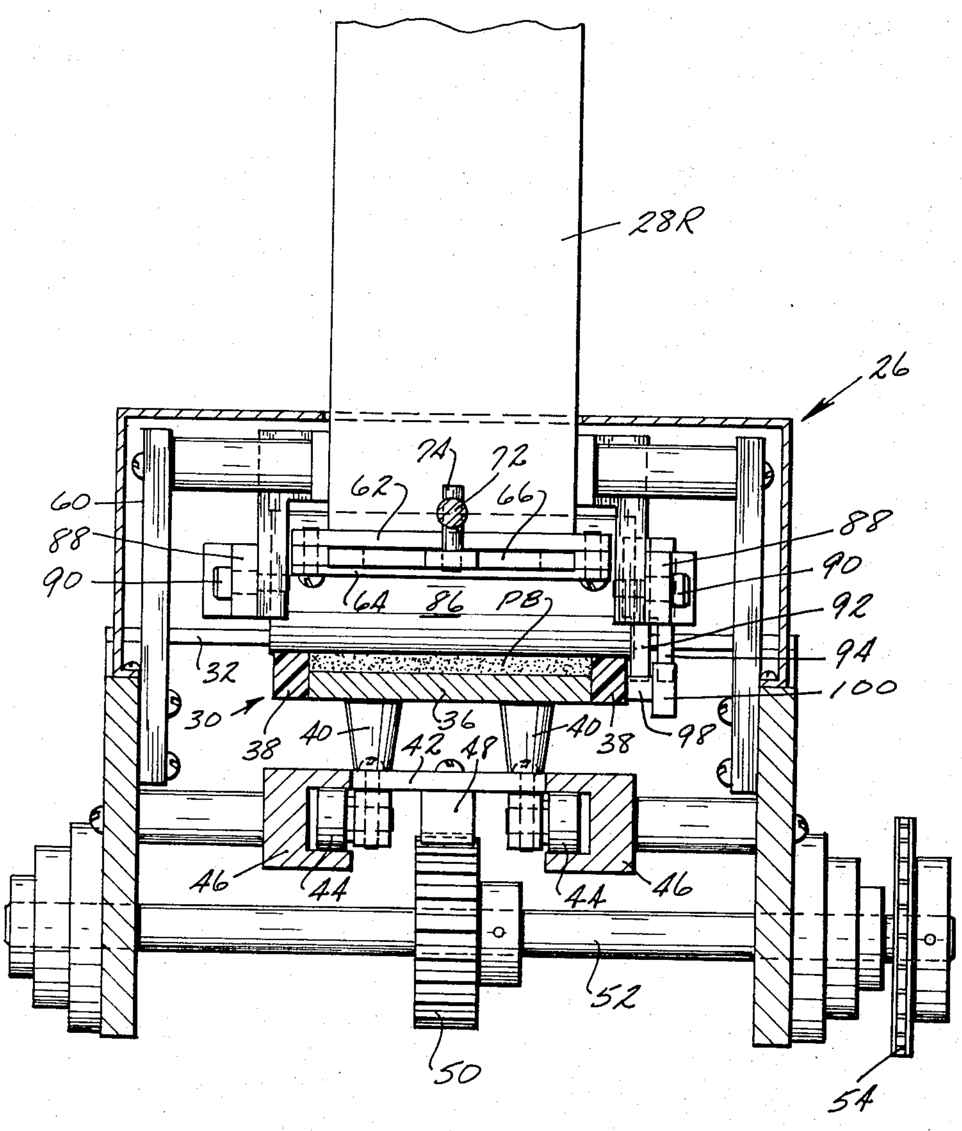
FIGURE 6 is a detail cross sectional view taken on the line 6—6 of FIGURE 4.

As best seen in FIGURE 6, tray 30 includes a metallic or electrically conductive bottom member 36 and side walls 38 of electrical insulating material which project upwardly above bottom 36 to form a tray adapted to contain a relatively deep powder bed PB. The tray bottom 36 is supported upon a plurality of mounting posts 40, also of electrical insulating material, which are in turn fixedly mounted upon a frame plate 42. A plurality of rollers 44 are mounted upon the underside of frame plate 42 and are received in ways 46 fixedly mounted upon casing 26, rollers 44 supporting the tray 30 for longitudinal movement back-and-forth beneath the hoppers and stencil screen. As best seen in FIGURE 6, tray 30 is driven in the longitudinal reciprocatory movement by a rack and pinion arrangement which includes a rack 48 fixedly mounted on the underside of frame plate 42 in mesh with a pinion gear 50 fixedly mounted upon a shaft 52 rotatably journalled in casing 26 and driven by a chain and sprocket assembly 54 from a reversible drive motor 56 (FIGURE 5).

The total length of the longitudinal stroke of tray 30 is substantially less than twice the total length of the tray so that the tray always underlies both of hoppers 28L and 28R. In FIGURE 4, tray 30 is shown at its extreme rightward end limit of movement with the right-hand end 30R of the tray located adjacent the extreme right-hand end of casing 26. In FIGURE 7, the tray is shown at its extreme left-hand limit of movement with the right-hand end 30R of the tray being located to the right of the lower end of hopper 28R.

Referring to FIGURE 4, a limit switch LSR is mounted upon casing 26 to be engaged by a cam 58 mounted upon tray 30 when the tray arrives at its right-hand end limit of movement. Limit switch LSR, when engaged by cam 58, actuates a suitable control circuit, not shown, to reverse the direction of drive 56 to cause tray 30 to be driven toward the left as viewed in FIGURE 7. A similar limit switch (not shown) is employed at the left-hand end of casing 26 to again reverse the direction of drive when tray 30 reaches its left-hand end limit of movement.

At each end of the stroke of tray 30, a measured charge of powder is dispensed from one of the supply hoppers on to the tray to replenish the powder transferred from the bed to the offset plate assemblies during the stroke of the tray toward the particular end limit of movement. When the tray reaches its right-hand end limit of movement, a charge of powder is dispensed from hopper 28R onto the powder bed. Upon subsequent movement of the tray to the left, away from its right-hand end limit of movement, the doctor mechanism 34 associated with supply hopper 28R smooths the last dispensed charge of powder as the tray moves toward the left.

The dispensing of powder from the hoppers is under the control of a shutter mechanism located at the bottom of each hopper. Referring to FIGURE 7, hopper 28R is supported at its lower end by a stationary frame assembly 60 fixed to casing 26. A pair of horizontally extending upper and lower plates 62 and 64 extend laterally across frame 60 at the lower end of hopper 28R and are vertically spaced from each other to provide a sliding support for a shutter plate 66. The lower plate 64 is formed with an opening 68 which corresponds to the opening at the bottom of hopper 28R. Normally shutter plate 66 is maintained in the position shown in FIGURE 7 in which the plate closes the lower end of the hopper. The front end of shutter blade 66 is formed with a recess 70 which, when shutter plate 66 is moved to the right from the position shown in FIGURE 7, passes into underlying relationship with the hopper to thereby permit powder to fall from the hopper through recess 70 and opening 68 onto tray 30.

Shutter plate 66 is positioned by an operating rod 72 coupled, as by a pin 74, to the shutter plate and slidably supported from casing 26 as by brackets 76 (FIGURE 4). Referring now to FIGURE 4, at the opposite end of rod 72, a striker 78 is mounted upon the rod as by a setscrew 80 and projects downwardly from the rod into the path of movement of tray 30. When the tray approaches its right-hand end limit of movement, the end 30R of the tray engages striker 78, thereby shifting rod 72 to the right as viewed in FIGURE 4. This action in turn, shifts the shutter plate 66 to the right to the broken line position shown in FIGURE 7 to dispense the powder charge. Upon subsequent movement of tray 30 to the left from the FIGURE 4 position, the operating rod 72 is restored to its original position by a compression spring 82 which acts between a bracket 76 and a flange element 84 fixed on rod 72. The amount of powder dispensed from the hopper may be adjusted by adjusting the position of striker 78 longitudinally along rod 72. Striker 78 is provided with a bore which slidably receives the rod and setscrew 80 is employed to lock the striker in its position of longitudinal adjustment.

Because the powder which is dispensed from the hopper tends to pile up upon the tray, doctor mechanisms 34 are employed in association with each hopper to smooth the surface of the powder bed flush with the top edge of the tray during movement of the freshly dispensed powder supply toward the stencil screen area. Each doctor assembly 34 includes a doctor bar 86 in the form of a cylindrical rod which is supported at either end by support link 88. Links 88 are pivotally mounted at their opposite ends as by pins 90 to a stationary frame element so that links 88 and bar 86 can pivot between the full line and dotted line positions indicated in FIGURE 7. While bar 86 is of circular cross section, it is non-rotatably mounted upon links 88, its circular configuration performing a more efficient doctoring of the powder bed than would a rectangular surface.

Doctor bar 86 is normally gravitationally maintained in sliding engagement with the upper edge surfaces of the sides of tray 30, this position being indicated in full line in FIGURE 7.

During movement of the bed in either direction, a small pile of powder, such as that indicated at A in FIGURE 7 tends to accumulate behind the doctor bar. To prevent this pile from building up too much, as the tray approaches either end of its strokes, both doctor bars are temporarily elevated so that the accumulated pile of powder A can pass from one side of the doctor bar freely underneath it to the opposite side and thus be in position to be smoothed by the doctor bar upon the reversal of the direction of movement of tray 30. To accomplish this temporary elevation of the doctor bar at each end of the stroke of the tray, a pair of oppositely acting one-way pawls 92 and 94 are pivotally mounted as by a pin 96 upon one of the support links 88. As best seen in FIGURE 6, the two pawls 94 and 92 are spaced in side-by-side relationship to each other and corresponding cams 98 and 100 are mounted in fixed relationship upon the side of tray 30 to contact the respective pawls at appropriate portions of the stroke of tray 30.

Returning to FIGURE 7, it is seen that pawl 92 is formed with an inclined surface 102 and, immediately to the left of pawl 92 an abutment 104 having a vertical surface 106 and an inclined surface 108 is fixedly mounted upon support link 88. With this configuration, it is believed apparent that counterclockwise rotation of pawl 92 about its pivot 96 is limited by the engagement of the side of the pawl with the vertical abutment surface 106, while at the same time, pawl 92 can rotate in a clockwise direction until its side surface engages the inclined abutment surface 108.

Pawl 94 is likewise aligned with an abutment 110 having a vertical abutment surface 112 and an inclined abutment surface 114. Pawl 94 and its abutment surfaces are oppositely related to each other as compared to pawl 92 and abutment 104, and therefore pawl 94 is restricted against clockwise pivotal movement, but can move in counterclockwise pivotal movement.

The operation of the pawls is as follows. Referring to FIGURE 7, let it be assumed that tray 30 is at a position to the right of that shown in FIGURE 7 so that pawl 94 is located on the left-hand side of cam 100, which is fixed on tray 30. As the tray moves from the imagined position toward the left, the left-hand side of cam 100 will strike the lower side of pawl 94. This would tend to rotate pawl 94 in a clockwise direction, however, vertical abutment 112 prohibits this movement and thus pawl 94 remains in a substantially vertical position and rides up the inclined surface 116 of cam 100, thereby elevating doctor bar 86 to permit the accumulated pile of powder A to pass beneath the doctor bar to its left-hand side. Upon subsequent reversal of movement of the direction of tray 30, as the tray moves to the right, the pile of powder thus accumulated on the left-hand side of doctor bar 86 is smoothed down by the bar.

The elevation of the doctor bar is of greater importance, however, in by-passing the accumulated pile of particles which accumulates in front of the right-hand doctor bar shown in FIGURE 7 during rightward movement of the tray 30. The electrostatic transfer of particles from the bed roughens the surface of the bed and during the rightward movement of the tray, a fairly substantial pile of particles becomes accumulated in front of the doctor bar. Elevation of the doctor bar shown in FIGURE 7 at the approach to the right-hand limit of movement is accomplished by pawl 92 which engages cam 98. Cam 98 is located adjacent the left-hand end of tray 30 and thus does not appear in FIGURE 7. However, its configuration is similar to that of cam 100.

*Operation*

To briefly review the overall operation of the apparatus disclosed, referring to FIGURES 1 and 2, offset plate conveyor 20 is driven in intermittent step-by-step movement by its drive system 33 to advance offset plate assemblies 24 in a clockwise direction along their paths as viewed in FIGURE 1. At the conclusion of each step of movement, an offset plate assembly 24 is located in registry with stencil screen 32, while another offset plate assembly 24 is located in position to print a bottle conveyor 22. Details of the operations of offset plate conveyor 20, bottle conveyor 22 and the steps involved in decorating the bottles form the subject matter of the above-mentioned application of A. S. Decker et al. Ser. No. 595,490.

Referring now particularly to FIGURE 7, powder bed support tray 30 is driven in continuous longitudinal reciprocatory movement as described above at a relatively low rate of speed. When an offset plate assembly 24 is located in operative registry with stencil screen 32, powder particles from the powder bed are electrostatically transferred, as by the techniques described in the aforementioned co-pending applications of William E. Johnson Ser. Nos. 439,799 and 575,868 through the image aperture of stencil screen 32 to the offset plate assembly 24 which is then in registry with the stencil screen. In FIGURE 7, the electrical connections are schematically illustrated as including voltage sources V1 and V2 respectively connected between electrical ground and the bottom of tray 30 and between ground and offset plate assembly 24. The electric potential may be applied in a pulse of relatively short duration, the pulse length being determined as for example, in the manner disclosed in the Johnson application Ser. No. 439,799.

Since as described in the aforementioned Johnson applications, the time duration of the application of the electric field during the electrostatic transfer of powder from the bed to the offset plate assembly may be of the order of 100 to 200 milliseconds, it is not essential that tray 30 be stationary during the transfer and, in fact, the tray is continuously moved at a relatively low rate of speed. Where automatic regulation of the time duration of the pulse in accordance with Johnson application Ser. No. 439,799 is employed, the rate of movement of tray 30 may, in fact, be so slow that the portions of the bed involved in successive powder transfers may overlap.

At the end of each longitudinal stroke of movement of tray 30, a charge of powder is dispensed from the appropriate hopper as described in detail above and smoothed by the associated doctor assembly during the subsequent movement of the tray in the opposite direction. The amount of powder discharged or dispensed is selected to be substantially equal to the amount of powder electrostatically transferred from the bed during the preceding stroke.

While one embodiment of our invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. In an electrostatic printing apparatus, an elongate powder supply tray adapted to contain a supply of electrostatic printing powder and mounted for longitudinal movement back-and-forth along a path between opposite end limits spaced from each other by a distance less than twice the length of said tray, a pair of powder supply hoppers mounted above said tray at locations symmetrically spaced on opposite sides of the mid point of said path at which both of said hoppers overlie said tray throughout its full range of movement, dispensing means on said hoppers actuable to dispense powder from the hopper on to said tray, a stencil screen mounted above said tray at a location between said hoppers, means for advancing substrate surfaces to be printed in succession into vertical registry with said stencil screen, means operable to electrically impel powder particles from said tray through said screen to a substrate surface in registry therewith, reversible drive means for moving said tray along said path, first means responsive to the arrival of said tray at either end limit of movement for actuating the dispensing means on the hopper adjacent that end limit to dispense a charge of powder from the hopper, second means operable upon the arrival of said tray at either end limit of movement for reversing said drive means to drive said tray toward the opposite end limit of movement, and doctor means located between each hopper and said stencil screen for doctoring the surface of powder in said tray during movement of the tray in a direction from the doctor means toward the stencil screen.

2. Apparatus as defined in claim 1 wherein said first means includes means for adjustably selecting the amount of powder to be dispensed from the associated hopper upon actuation of said dispensing means.

3. Apparatus as defined in claim 1 wherein said doctor means comprises a doctor bar assembly normally resting upon said tray, and means operable upon the approach of said tray to either end limit of movement for elevating the doctor bar assembly adjacent that end limit of movement to permit powder accumulated in front of the doctor bar assembly to be carried beyond the doctor bar assembly by movement of the tray to that end limit of movement.

4. Apparatus as defined in claim 3 wherein said means operable comprises a cam abutment on said tray, and one-way pawl means on said doctor bar assembly operable upon engagement with said cam abutment to elevate said doctor bar assembly during movement of said tray in one direction.

5. Apparatus as defined in claim 4 wherein said doctor bar assembly comprises a pair of support links mounted at one end for pivotal movement about a stationary axis, a doctor bar mounted upon and extending between the opposite ends of said support links, said one-way pawl means including a pawl pivotally supported on one of said support links, abutment means on said support means engageable with said pawl to permit said pawl to pivot freely from a normal position in one direction and to block pivotal movement of said pawl from said normal position in the opposite direction, said pawl when in said normal position projecting from said one of said support links into the path of movement of said cam abutment on said tray.

6. In an electrostatic printing process of the type wherein printing powder is electrostatically transferred from a powder supply bed through a stencil screen to a substrate surface; the improvement comprising the steps of supporting and moving an elongate supply bed of powder beneath a stencil screen in longitudinal reciprocatory movement between opposite end limits of movement, cyclically advancing substrate surfaces into vertical registry above said stencil screen and electrostatically transferring powder from said supply bed through the stencil screen to each registered substrate surface during movement of the bed between said end limits, depositing upon arrival of said bed at either one of said end limits of movement a charge of powder upon said bed in a location such that the deposited charge will be moved toward the stencil screen upon subsequent movement of the bed toward the other one of said end limits, the amount of powder in the deposited charge being sufficient to replace the amount of powder transferred from the bed during the previous movement of the bed toward the one end limit, and doctoring the deposited charge of powder as it is subsequently moved toward the stencil screen.

7. In an electrostatic printing process as defined in claim 6; the further improvement wherein the step of doctoring further comprises the steps of normally maintaining doctor bars in operative positions relative to the surface of the bed at respective locations between the stencil screen and the locations at which powder is deposited at the respective ends of the stroke of the bed, elevating the doctor bar at that side of the screen toward which the bed is moving prior to the arrival of the bed at that end limit of movement, and returning the elevated doctor bar to its original operative position before subsequent movement of the bed in the opposite direction.

References Cited

UNITED STATES PATENTS

| | | | |
|---|---|---|---|
| 923,837 | 6/1909 | Hautsch | 222—361 X |
| 1,077,999 | 11/1913 | Rees | 222—361 X |
| 3,218,967 | 11/1965 | Childress | 101—114 |
| 3,245,341 | 4/1966 | Childress et al. | 101—114 X |
| 3,276,358 | 10/1966 | Lusher | 101—129 |
| 3,306,193 | 2/1967 | Rarey et al. | 101—114 |

ROBERT E. PULFREY, *Primary Examiner.*

E. S. BURR, *Assistant Examiner.*